US011624003B2

United States Patent
Schaefer et al.

(10) Patent No.: US 11,624,003 B2
(45) Date of Patent: Apr. 11, 2023

(54) COLOUR-STABLE CURING COMPOSITIONS CONTAINING POLYISOCYANATES OF (CYCLO)ALIPHATIC DIISOCYANATES

(71) Applicant: BASF SE, Ludwigshafen am Rhein (DE)

(72) Inventors: Harald Schaefer, Ludwigshafen (DE); Thomas Genger, Ludwigshafen (DE); Sebastian Emmerling, Ludwigshafen (DE)

(73) Assignee: BASF SE

( * ) Notice: Subject to any disclaimer, the term of this patent is extended or adjusted under 35 U.S.C. 154(b) by 0 days.

(21) Appl. No.: 16/647,792

(22) PCT Filed: Sep. 11, 2018

(86) PCT No.: PCT/EP2018/074384
§ 371 (c)(1),
(2) Date: Mar. 16, 2020

(87) PCT Pub. No.: WO2019/057539
PCT Pub. Date: Mar. 28, 2019

(65) Prior Publication Data
US 2020/0216711 A1 Jul. 9, 2020

(30) Foreign Application Priority Data

Sep. 20, 2017 (EP) ..................... 17192033

(51) Int. Cl.
*C09D 175/04* (2006.01)
*C08G 18/02* (2006.01)
*C08G 18/08* (2006.01)
*C08G 18/73* (2006.01)
*C08G 18/79* (2006.01)
*C08G 18/83* (2006.01)
*C08K 5/134* (2006.01)
*C08K 5/54* (2006.01)
*C08K 5/56* (2006.01)

(52) U.S. Cl.
CPC ......... *C09D 175/04* (2013.01); *C08G 18/022* (2013.01); *C08G 18/0885* (2013.01); *C08G 18/73* (2013.01); *C08G 18/792* (2013.01); *C08G 18/836* (2013.01); *C08K 5/134* (2013.01); *C08K 5/5406* (2013.01); *C08K 5/56* (2013.01)

(58) Field of Classification Search
CPC .............. C08G 18/022; C08G 18/0885; C08G 18/73; C08G 18/792; C08G 18/836; C08K 5/134; C08K 5/5406; C08K 5/56; C09D 175/04
See application file for complete search history.

(56) References Cited

U.S. PATENT DOCUMENTS

| 4,596,678 | A |   | 6/1986 | Merger et al. |
| 4,596,679 | A |   | 6/1986 | Hellbach et al. |
| 5,011,881 | A | * | 4/1991 | Fujii ................. C08G 18/0823 524/507 |
| 5,087,739 | A |   | 2/1992 | Bohmholdt et al. |
| 5,202,358 | A |   | 4/1993 | Scholl et al. |
| 5,260,481 | A |   | 11/1993 | Scholl |
| 8,552,137 | B2 |   | 10/2013 | Bernard et al. |
| 2008/0257214 | A1 |   | 10/2008 | Bernard et al. |

FOREIGN PATENT DOCUMENTS

| CN | 101786994 A | 7/2010 |
| CN | 101805304 A | 8/2010 |
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 355 443 A2 | 2/1990 |
| EP | 0 403 921 A2 | 12/1990 |
| EP | 0 508 216 A1 | 10/1992 |
| EP | 0 515 933 A2 | 12/1992 |
| EP | 1 833 785 B1 | 10/2013 |
| JP | 2004-26962 A | 1/2004 |
| JP | 4178370 B2 | 11/2008 |
| WO | WO 2004/076519 A1 | 9/2004 |
| WO | WO 2004/076520 A1 | 9/2004 |
| WO | WO 2005/087828 A1 | 9/2005 |
| WO | WO 2005/089085 A2 | 9/2005 |
| WO | WO 2007/039133 A1 | 4/2007 |
| WO | WO 2008/068198 A1 | 6/2008 |
| WO | WO 2008/116893 A1 | 10/2008 |
| WO | WO 2008/116894 A1 | 10/2008 |
| WO | WO 2008/116895 A1 | 10/2008 |
| WO | WO 2013/060614 A1 | 5/2013 |
| WO | WO 2013/060809 A2 | 5/2013 |

OTHER PUBLICATIONS

Machine English translation of JP 2004-026962 Yoshida et al., Jan. 29, 2004.*
U.S. Appl. No. 16/621,879, filed Dec. 12, 2019, Harald Schaefer et al.
U.S. Appl. No. 16/339,124, filed Apr. 3, 2019, Harald Schaefer et al.
U.S. Appl. No. 16/339,544, filed Apr. 4, 2019, Harald Schaefer et al.
U.S. Appl. No. 16/648,451, filed Mar. 18, 2020, Harald Schaefer et al.
European Search Report dated Mar. 19, 2018, in Patent Application No. 17192033.3, 4 pages (with English Translation of Category of Cited Documents).
International Search Report dated Jan. 7, 2019 in PCT/EP2018/074384 filed Sep. 11, 2018, 3 pages.

* cited by examiner

*Primary Examiner* — Patrick D Niland
(74) *Attorney, Agent, or Firm* — Faegre Drinker Biddle & Reath LLP

(57) ABSTRACT

The present invention relates to novel color drift-stable compositions of polyisocyanates of (cyclo)aliphatic diisocyanates.

14 Claims, No Drawings

COLOUR-STABLE CURING COMPOSITIONS CONTAINING POLYISOCYANATES OF (CYCLO)ALIPHATIC DIISOCYANATES

The present invention relates to novel color drift-stable compositions comprising polyisocyanates of (cyclo)aliphatic diisocyanates. The invention further relates to a process for stabilizing polyisocyanate compositions, to a process for producing polyurethane coatings, and to the use of the color drift-stable composition as curing agent in coating materials.

JP4178370 B2 describes a solution consisting of an NCO-terminated urethane prepolymer, especially based on toluene diisocyanate, a silyl phosphate and/or phosphonate and solvent, and an adhesive or a paint using the solution. Specifically described in the examples are three toluene diisocyanate-based, one methylenediphenyl-based and one hexamethylene diisocyanate-based prepolymer.

U.S. Pat. No. 8,552,137 B2 describes silyl compounds as dehydrating agents (water scavengers), especially in relation to moisture content in polar solvents, in the case of polar polyisocyanates. The polyisocyanate in the examples is a hydrophilized polyisocyanate comprising 4.66% phosphate ester of a polyethoxylated alcohol comprising 13 carbon atoms and six ethylene oxide units, mono-/disubstituted in a ratio of 70/30, and 4.66% phosphate ester of a polyethoxylated alcohol comprising eight ethylene oxide units; mono-/disubstituted in a ratio of 70/30, and 2.22% dimethylcyclohexylamine for neutralization, and is thus in the form of a hydrophilic salt.

WO 2005/089085 describes polyisocyanate compositions as curing agents for two component (2K) polyurethane coatings which, as well as a catalyst for the reaction between isocyanate groups and groups reactive toward them, comprises a stabilizer mixture selected from sterically hindered phenols and secondary arylamines, and also trialkyl or triaryl phosphites. There is explicit disclosure in the examples of a polyisocyanate composition, the isocyanurate Tolonate HDT, with dibutyltin dilaurate as catalyst in butyl acetate/methyl amyl ketone/xylene 1:1:0.5.

WO 2008/116895 describes polyisocyanate compositions as curing agent for 2-component polyurethane coating comprising, as well as a catalyst for the reaction between isocyanate groups and groups reactive therewith, a stabilizer mixture selected from sterically hindered phenols and phosphonates.

Still further improvement is possible in terms of color stabilization against drift.

WO 2013060614 describes polyisocyanate compositions comprising (A) at least one polyisocyanate obtainable by reacting at least one monomeric isocyanate, (B) at least one Lewis-acidic organic metal compound capable of accelerating the reaction of isocyanate groups with isocyanate-reactive groups, (C) at least one Brønsted acid having a pKa less than 4, (D) at least one sterically hindered phenol, (E) at least one solvent, (F) optionally other coatings additives. Brønsted acids such as di(2-ethylhexyl) phosphate, in the presence of dibutyltin dilaurate in coatings solvents such as butyl acetate, form precipitates with formation of a complex comprising tin:phosphorus=1:2.

It was an object of the present invention to provide storage-stable polyisocyanate compositions which already comprise a catalyst for the reaction between isocyanate groups and groups reactive therewith and are color-stable during storage, and the stabilizing effect of which is improved over the prior art. In addition, the polyisocyanate compositions should not have significant haze.

The object was achieved by polyisocyanate compositions comprising
(A) at least one polyisocyanate obtainable by reacting at least one monomeric (cyclo)aliphatic isocyanate, wherein the at least one polyisocyanate has an NCO content of at least 15% by weight,
(B) at least one silyl ester selected from the group of silyl phosphates and silyl phosphonates in an amount of 0.2 to 300 ppm by weight, based on component (A),
(C) at least one sterically hindered phenol,
(D) at least one Lewis-acidic organic metal compound capable of accelerating the reaction of isocyanate groups with isocyanate-reactive groups,
(E) at least one solvent,
(F) optionally at least one further antioxidant,
(G) optionally other coatings additives.

Polyisocyanate compositions of this kind have good color stability over time in the course of storage ("color drift") and can be reacted with components comprising isocyanate-reactive groups in polyurethane coatings.

Also found have been a process for stabilizing the polyisocyanate compositions, a process for producing polyurethane coatings, and the use of the polyisocyanate compositions as curing agent in coating materials.

The monomeric isocyanates used may be aliphatic or cycloaliphatic, which is referred to for short in this text as (cyclo)aliphatic. Aliphatic isocyanates are particularly preferred.

Cycloaliphatic isocyanates are those which comprise at least one cycloaliphatic ring system.

Aliphatic isocyanates are those which comprise exclusively linear or branched chains, in other words acyclic compounds.

The monomeric isocyanates are preferably diisocyanates bearing exactly two isocyanate groups.

In principle, higher monomeric isocyanates having an average of more than two isocyanate groups are also an option. Suitable examples of these include tri isocyanates such as tri isocyanatononane and 2'-isocyanatoethyl 2,6-di isocyanato-hexanoate.

These monomeric isocyanates do not contain any substantial products of reaction of the isocyanate groups with themselves.

The monomeric isocyanates are preferably isocyanates having 4 to 20 carbon atoms.

Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3(or 4), 8(or 9)-bis-(isocyanatomethyl)tricyclo[5.2.1.0$^{2,6}$]decane isomer mixtures.

Particular preference is given to hexamethylene 1,6-diisocyanate, pentamethylene 1,5-diisocyanate, 1,3-bis(isocyanatomethyl)cyclohexane, isophorone diisocyanate and 4,4'- or 2,4'-di(isocyanatocyclohexyl)methane, very particular preference to isophorone diisocyanate and hexamethylene 1,6-diisocyanate, especial preference to hexamethylene 1,6-diisocyanate.

It is also possible for mixtures of the isocyanates mentioned to be present.

Isophorone diisocyanate is usually in the form of a mixture, specifically a mixture of the cis and trans isomers, generally in a proportion of about 60:40 to 90:10 (w/w), preferably of 70:30-90:10.

Dicyclohexylmethane 4,4'-diisocyanate may likewise be in the form of a mixture of the different cis and trans isomers.

For the present invention it is possible to use not only those diisocyanates which are obtained by phosgenating the corresponding amines but also those which are prepared without the use of phosgene, i.e. by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3 isocyanatomethyl-3,5,5-trimethylcyclohexane (isophorone diisocyanate or IPDI), can, for example, be prepared by reacting the (cyclo) aliphatic diamines with, for example, urea and alcohols to give (cyclo)aliphatic biscarbamic esters and subjecting said esters to thermal cleavage into the corresponding diisocyanates and alcohols. The synthesis is usually effected continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention, the isocyanates used contain less than 100 ppm of hydrolyzable chlorine, preferably less than 50 ppm, particularly less than 30 ppm and especially less than 20 ppm. This can be measured, for example, by ASTM method D4663-98. The contents of total chlorine are, for example, below 1000 ppm by weight, preferably below 800 ppm by weight and more preferably below 500 ppm by weight (determined by argentometric titration after hydrolysis).

It is of course also possible to use mixtures of those monomeric isocyanates which have been obtained by reaction of the (cyclo)aliphatic diamines with, for example, urea and alcohols and cleavage of the (cyclo)aliphatic biscarbamic esters obtained with those diisocyanates which have been obtained by phosgenation of the corresponding amines.

The polyisocyanates (A), which can be formed by oligomerizing the monomeric isocyanates, are generally characterized as follows:

The mean NCO functionality of such compounds is generally at least 1.8 and may be up to 8, preferably 2 to 5, and more preferably 2.4 to 4.

The content of isocyanate groups after oligomerization, calculated as NCO=42 g/mol, is at least 15% by weight, preferably at least 20% by weight. More preferably, the content of isocyanate groups after the oligomerization is at least 20% by weight and at most 30% by weight.

Preferably, the polyisocyanates (A) are the following compounds:

1) Polyisocyanates which have isocyanurate groups and derive from aliphatic and/or cycloaliphatic diisocyanates. Particular preference here is given to diisocyanates based on hexamethylene diisocyanate and isophorone diisocyanate. The isocyanurates present are, in particular, tris (isocyanatoalkyl) and/or tris(isocyanatocycloalkyl) isocyanurates, which constitute cyclic trimers of the diisocyanates, or are mixtures with their higher homologs having more than one isocyanurate ring. The isocyanatoisocyanurates generally have an NCO content of 15 to 30% by weight, in particular 15 to 25% by weight, and an average NCO functionality of 2.6 to 8.

The polyisocyanates having isocyanurate groups may, to a smaller degree, also comprise allophanate and/or urethane groups, preferably with a content of bound alcohol of less than 2%, based on the polyisocyanate.

2) Polyisocyanates having uretdione groups, with aliphatically and/or cycloaliphatically bonded isocyanate groups, in particular those derived from hexamethylene diisocyanate or isophorone diisocyanate. Uretdione diisocyanates are cyclic dimerization products of diisocyanates.

The polyisocyanates having uretdione groups are frequently obtained in a mixture with other polyisocyanates, especially those mentioned under 1).

Polyisocyanates having uretdione groups typically have functionalities of 2 to 3. This also includes uretdione/ isocyanurate mixtures of any composition, especially with a content of monomeric uretdione (dimer) of 1-40%, especially 3-15%, especially 5-10%.

To this end, the diisocyanates are converted under reaction conditions under which both uretdione groups and the other polyisocyanates are formed, or the uretdione groups are formed first and these are subsequently converted to the other polyisocyanates, or the diisocyanates are first converted to the other polyisocyanates and these are then converted to products containing uretdione groups.

3) Biuret group-containing polyisocyanates having cycloaliphatically or aliphatically bonded isocyanate groups, especially tris(6-isocyanatohexyl)biuret or mixtures thereof with higher homologs thereof. These polyisocyanates having biuret groups generally have an NCO content of 18% to 24% by weight and an average NCO functionality of 2.8 to 6.

4) Allophanate and/or urethane group-containing polyisocyanates having aliphatically or cycloaliphatically bonded isocyanate groups, as formed, for example, by reaction of excess amounts of diisocyanate, for example hexamethylene diisocyanate or isophorone diisocyanate, with mono- or polyhydric alcohols. These polyisocyanates having allophanate and/or urethane groups generally have an NCO content of 15% to 24% by weight and an average NCO functionality of 2.0 to 4.5. Such allophanate and/or urethane group-containing polyisocyanates may be prepared without catalysis or preferably in the presence of catalysts, for example ammonium carboxylates or hydroxides, or allophanatization catalysts, for example bismuth, cobalt, cesium, Zn(II) or Zr(IV) compounds, in each case in the presence of monohydric, dihydric or polyhydric, preferably monohydric, alcohols.

These polyisocyanates having allophanate and/or urethane groups frequently occur in mixed forms with the polyisocyanates mentioned under 1).

5) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts, e.g. phosphonium hydrogen difluoride.

6) Hyperbranched polyisocyanates, of the kind known for example from DE-A1 10013186 or DE-A1 10013187.
7) Said polyisocyanates, after preparation thereof, can be converted to biuret group-containing or allophanate/urethane group-containing polyisocyanates having cycloaliphatically or aliphatically bonded isocyanate groups. Biuret groups are formed, for example, by addition of water or reaction with amines. Allophanate/urethane groups are formed by reaction with monohydric, dihydric or polyhydric, preferably monohydric, alcohols, optionally in the presence of suitable catalysts. These biuret or allophanate/urethane group-containing polyisocyanates generally have an NCO content of 15% to 25% by weight and an average NCO functionality of 3 to 8.
8) Modified polyisocyanates for dual-cure applications, i.e. polyisocyanates which, as well as the groups described under 1)-7), comprise those which arise in a formal sense through addition of molecules having NCO-reactive groups and groups crosslinkable by UV or actinic radiation onto the isocyanate groups of the above molecules. These molecules are, for example, hydroxyalkyl (meth) acrylates and other hydroxyl-vinyl compounds.

The diisocyanates or polyisocyanates listed above may also be at least partly in blocked form.

Classes of compound used for blocking are described in D. A. Wicks, Z. W. Wicks, Progress in Organic Coatings, 36, 148-172 (1999), 41, 1-83 (2001) and 43, 131-140 (2001).

Examples of classes of compound used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

In a preferred embodiment of the present invention, the polyisocyanate is selected from the group consisting of isocyanurates, biurets, allophanate/(urethane)/isocyanurate mixtures, asymmetric isocyanurates (iminooxadiazinedione), preferably from the group consisting of isocyanurates, allophanate/(urethane)/isocyanurate mixtures, and it is more preferably a polyisocyanate containing isocyanurate groups.

In a particularly preferred embodiment, the polyisocyanate comprises polyisocyanates which comprise isocyanurate groups and derive from hexamethylene 1,6-diisocyanate.

In a further preferred embodiment, the polyisocyanate is a mixture of polyisocyanates comprising isocyanurate groups, most preferably of hexamethylene 1,6-diisocyanate and isophorone diisocyanate.

In a particularly preferred embodiment, the polyisocyanate is a polyisocyanate comprising predominantly isocyanurate groups, having a viscosity of 500-4000 mPa*s, and/or a low-viscosity allophanate optionally comprising isocyanurate and/or urethane, having a viscosity of 150-1600 mPa*s.

In this specification, unless noted otherwise, the viscosity is reported at 23° C. in accordance with DIN EN ISO 3219/A.3 in a cone/plate system with a shear rate of 1000 s$^{-1}$.

The process for preparing the polyisocyanates may take place as described in WO 2008/68198, especially from page 20 line 21 to page 27 line 15 therein, which is hereby incorporated into the present application by reference.

The reaction can be discontinued, for example, as described therein from page 31 line 19 to page 31 line 31, and working up may take place as described therein from page 31 line 33 to page 32 line 40, which in each case is hereby part of the present application by reference.

The reaction can alternatively and preferably be effected as described in WO 2005/087828 for ammonium alpha-hydroxycarboxylate catalysts. The reaction can be stopped, for example, as described in WO 2005/087828 from page 11 line 12 to page 12 line 5, which is hereby incorporated into the present application by reference.

The reaction can alternatively be effected as described in CN 10178994A or CN 101805304.

The polyisocyanates are preferably prepared using a catalyst based on ammonium carboxylate, ammonium α-hydroxyalkylcarboxylate or ammonium hydroxide.

In the case of thermally labile catalysts, it is additionally also possible to stop the reaction by heating the reaction mixture to a temperature above at least 80° C., preferably at least 100° C., more preferably at least 120° C. The heating of the reaction mixture is generally already sufficient for this purpose, as required for removal of the unconverted isocyanate by distillation in the workup.

In the case both of thermally non-labile catalysts and of thermally labile catalysts, it is possible to stop the reaction at relatively low temperatures by addition of deactivators.

Examples of suitable deactivators are hydrogen chloride, phosphoric acid, organic phosphates, such as dibutyl phosphate or diethylhexyl phosphate, and carbamates such as hydroxyalkyl carbamate.

These compounds are added neat or diluted in a suitable concentration as necessary to stop the reaction.

Silyl esters (B) are selected from the group of silyl phosphates and silyl phosphonates.

Preferred silyl esters (B) are the following compounds:

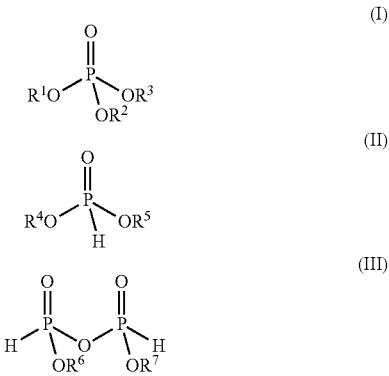

In these, the $R^1$ to $R^7$ radicals are each independently trialkylsilyl group, alkyl group or hydrogen, where each compound must contain at least one trialkylsilyl group. The $R^1$ to $R^7$ radicals are preferably each trialkylsilyl groups or alkyl groups, where each compound must contain at least one trialkylsilyl group. More preferably, all $R^1$ to $R^7$ radicals are trialkylsilyl groups.

The alkyl groups and the alkyl groups in the trialkylsilyl groups are preferably $C_1$- to $C_{18}$-alkyl groups.

Preferably, the alkyl groups in the trialkylsilyl groups are the same.

Preferably, the alkyl groups in the trialkylsilyl groups are methyl or ethyl, more preferably methyl.

Tris(trimethylsilyl) phosphate is the particularly preferred species.

Particularly preferred silyl esters (B) are silyl phosphates, especially preferably tris(silyl) phosphate, most preferably tris(trimethylsilyl) phosphate.

The silyl esters (B) are added in amounts, based on component (A), of 0.2 to less than 300 ppm by weight, preferably of 1 to 300 ppm by weight, more preferably of 10 to 300 ppm by weight, most preferably of 30 to 200 ppm by weight.

Sterically hindered phenols (C) in the context of the invention have the function of a primary antioxidant. This is typically understood by the person skilled in the art to mean compounds that scavenge free radicals.

Sterically hindered phenols of this kind are described, for example, in WO 2008/116894, preferably the compounds described from page 14 line 10 to page 16 line 10 therein, which is hereby incorporated into the present disclosure by reference.

These are preferably those phenols that have exactly one phenolic hydroxyl group on the aromatic ring, and more preferably those that have a substituent, preferably an alkyl group, in the ortho positions, most preferably in the ortho and para positions, to the phenolic hydroxyl group, especially alkyl 3-(3,5-di-tert-butyl-4-hydroxyphenyl)propionates, or substituted alkyl derivatives of such compounds.

Such phenols may also be constituents of a polyphenolic system with multiple phenol groups, pentaerythritol tetrakis (3-(3,5-di-tert-butyl-4-hydroxyphenyl)propionate (e.g. Irganox® 1010); ethylenebis(oxyethylene) bis(3-(5-tert-butyl-4-hydroxy-m-tolyl)propionate) (e.g. Irganox® 245); 3,3',3",5,5',5"-hexa-tert-butyl-α,α',α"-(mesitylene-2,4,6-triyl)tri-p-cresol (e.g. Irganox® 1330); 1,3,5-tris(3,5-di-tert-butyl-4-hydroxybenzyl)-1,3,5-triazine-2,4,6(1H,3H,5H)-trione (e.g. Irganox® 3114), each products from Ciba Spezialitätenchemie, now BASF SE.

Corresponding products are available, for example, under the following trade names: Irganox® (BASF SE), Sumilizer® from Sumitomo, Lowinox® from Great Lakes, Cyanox® from Cytec.

Other possible examples are thiodiethylene bis[3-[3,5-di-tert-butyl-4-hydroxyphenyl]propionate] (e.g. Irganox® 1035) and 6,6'-di-tert-butyl-2,2'-thiodi-p-cresol (e.g. Irganox® 1081), each BASF SE products.

Preference is given to 2,6-bis-tert-butyl-4-methylphenol (BHT), 3-[3,5-di-tert-butyl-4-hydroxyphenyl] propionate, pentaerythritol tetrakis(3-(3,5-di-tert-butyl-4-hydroxyphenyl)-propionate (CAS No. 6683-19-8; e.g. Irganox® 1010), 3,3',3",5,5',5"-hexa-tert-butyl-a,a',a"-(mesitylene-2,4,6-triyl)tri-p-cresol (CAS No. 1709-70-2; e.g. Irganox® 1330), 1,3,5-tris(3,5-di-tert-butyl-4-hydroxybenzyl)-1,3,5-triazine-2,4,6(1H,3H,5H)-trione (CAS No. 27676-62-6; e.g. Irganox® 3114), isooctyl 3-(3,5-di-tert-butyl-4-hydroxyphenyl)propionate (CAS No. 146598-26-7, e.g. Irganox® 1135) and octadecyl 3-(3,5-di-tert-butyl-4-hydroxyphenyl) propionate (CAS No. 2082-79-3, e.g. Irganox® 1076).

Particular preference is given to 2,6-di-tert-butyl-4-methylphenol (BHT); isooctyl 3-(3,5-di-tert-butyl-4-hydroxyphenyl)propionate (CAS No. 146598-26-7, Irganox® 1135), octadecyl 3-(3,5-di-tert-butyl-4-hydroxyphenyl)propionate (CAS No. 2082-79-3, Irganox® 1076) and pentaerythritol tetrakis(3-(3,5-di-tert-butyl-4-hydroxyphenyl)propionate (CAS No. 6683-19-8; e.g. Irganox® 1010).

Examples of useful Lewis-acidic organic metal compounds (D) include tin compounds, such as tin(II) salts of organic carboxylic acids, e.g. tin(II) diacetate, tin(II) dioctoate, tin(II) bis(ethylhexanoate) and tin(II) dilaurate, and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate.

Further preferred Lewis-acidic organic metal compounds are zinc salts, for example zinc(II) diacetate and zinc(II) dioctoate.

Tin- and zinc-free alternatives used include organic metal salts of bismuth, zirconium, titanium, aluminum, iron, manganese, nickel and cobalt.

These are, for example, zirconium tetraacetylacetonate (e.g. K-KAT® 4205 from King Industries); zirconium dionates (e.g. K-KAT® XC-9213; XC-A 209 and XC-6212 from King Industries); bismuth compounds, more particularly tricarboxylates (e.g. K-KAT® 348, XC-B221; XC-C227, XC 8203 from King Industries); aluminum dionate (e.g. K-KAT® 5218 from King Industries). Tin-free and zinc-free catalysts are otherwise also offered, for example, under the trade name Borchi® Kat from Borchers, Tego® from Evonik, TIB Kat® from TIB Chemicals or BICAT® from Shepherd, Lausanne.

Bismuth and cobalt catalysts, cerium salts such as cerium octoates, and cesium salts may also be used as catalysts.

Bismuth catalysts are especially bismuth carboxylates, especially bismuth octoates, ethylhexanoates, neodecanoates or pivalates; for example K-KAT® 348 and XK-601 from King Industries, TIB KAT® 716, 716LA, 716XLA, 718, 720, 789 from TIB Chemicals and those from Shepherd Lausanne, and catalyst mixtures of, for example, bismuth and zinc organyls.

Further metal catalysts are described by Blank et al. in Progress in Organic Coatings, 1999, vol. 35, pages 19-29.

These catalysts are suitable for solvent-based, water-based and/or blocked systems.

Molybdenum catalysts, tungsten catalysts and vanadium catalysts are described especially for the conversion of blocked polyisocyanates in WO 2004/076519 and WO 2004/076520.

Cesium salts as well can be used as catalysts. Suitable cesium salts include compounds employing the following anions: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n represents the numbers 1 to 20. Preference is given to cesium carboxylates in which the anion obeys the formulae $(C_nH_{2n-1}O_2)^-$ and $(C_{n+1}H_{2n-2}O_4)^{2-}$ where n is 1 to 20. Particularly preferred cesium salts have, as anions, monocarboxylates of the general formula $(C_nH_{2n-1}O_2)^-$ where n represents the numbers 1 to 20. In this connection, particular mention should be made of formate, acetate, propionate, hexanoate and 2-ethyl hexanoate.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, and bismuth compounds.

Particular preference is given to dibutyltin dilaurate.

In addition, at least one solvent (E) is also present.

Solvents usable for the polyisocyanate component, and also for the binder components and any other components, are those that do not have any groups reactive toward isocyanate groups or capped isocyanate groups and in which the polyisocyanates are soluble to an extent of at least 10% by weight, preferably to an extent of at least 25%, more preferably to an extent of at least 50%, even more preferably to an extent of at least 75%, particularly to an extent of at least 90% and especially to an extent of at least 95% by weight.

Examples of such solvents are aromatic (including alkylated benzenes and naphthalenes) and/or (cyclo)aliphatic hydrocarbons and mixtures thereof, ketones, esters, alkoxylated alkyl alkanoates, ethers, ether esters, or mixtures of the solvents.

Preferred aromatic hydrocarbon mixtures are those that comprise predominantly aromatic $C_7$ to $C_{14}$ hydrocarbons and may encompass a boiling range from 110° C. to 300° C., particular preference being given to toluene, o-, m- or p-xylene, trimethylbenzene isomers, tetramethylbenzene isomers, ethylbenzene, cumene, tetrahydronaphthalene and mixtures comprising these compounds.

Examples include the Solvesso® range from ExxonMobil Chemical, particularly Solvesso® 100 (CAS-No. 64742-95-6, predominantly $C_9$ and $C_{10}$-aromatics, boiling range about 154° C.-178° C.), 150 (boiling range about 182° C.-207° C.) and 200 (CAS-No. 64742-94-5), and also the Shellsol® range from Shell, Caromax® (e.g. Caromax® 18) from Petrochem Carless and Hydrosol® from DHC (e.g. Hydrosol® A 170). Hydrocarbon mixtures composed of paraffins, cycloparaffins and aromatics are also commercially available under the Kristalloel (for example Kristalloel 30, boiling range about 158-198° C. or Kristalloel 60: CAS No. 64742-82-1), white spirit (for example likewise CAS No. 64742-82-1) or Solvent naphtha (light: boiling range about 155-180° C., heavy: boiling range about 225-300° C.) trade names. The aromatics content of such hydrocarbon mixtures is generally more than 90 wt %, preferably more than 95 wt %, particularly preferably more than 98 wt % and very particularly preferably more than 99 wt %. It may be advantageous to use hydrocarbon mixtures having a particularly reduced content of naphthalene.

(Cyclo)aliphatic hydrocarbons include for example decalin, alkylated decalin and isomer mixtures of linear or branched alkanes and/or cycloalkanes.

The content of aliphatic hydrocarbons is generally less than 5%, preferably less than 2.5% and more preferably less than 1% by weight.

Esters are, for example, n-butyl acetate, isobutyl acetate, ethyl acetate, 1-methoxy-2-propyl acetate and 2-methoxyethyl acetate.

Ethers are, for example, dioxane and the dimethyl, -ethyl or -n-butyl ethers of ethylene glycol, diethylene glycol, triethylene glycol, propylene glycol, dipropylene glycol or tripropylene glycol.

Ketones are, for example, acetone, diethyl ketone, ethyl methyl ketone, isobutyl methyl ketone, methyl amyl ketone, cyclohexanone and tert-butyl methyl ketone.

Ether esters are, for example, ethyl ethoxypropionate EEP, methoxymethyl acetate, butoxyethyl acetate BGA, ethoxy-1-methylethyl acetate, methoxy-1-methylethyl acetate.

Preferred solvents are n-butyl acetate, ethyl acetate, 1-methoxy-2-propyl acetate, 2-methoxyethyl acetate, methyl amyl ketone and mixtures thereof, especially with the above-detailed aromatic hydrocarbon mixtures, especially xylene and Solvesso® 100. Mixtures of this kind may be created in a volume ratio of 5:1 to 1:5, preferably in a volume ratio of 4:1 to 1:4, more preferably in a volume ratio of 3:1 to 1:3 and most preferably in a volume ratio of 2:1 to 1:2.

Preferred examples are butyl acetate/xylene, methoxypropyl acetate/xylene 1:1, butyl acetate/Solvent naphtha 100 1:1, butyl acetate/Solvesso® 100 1:2 and Kristalloel 30/Shellsol® A 3:1.

It has been found that the solvents are problematic to different degrees in relation to the objective. Polyisocyanate compositions that comprise ketones or aromatic mixtures (for example Solvent Naphtha mixtures) are particularly critical in relation to color number development in the course of storage. By contrast, esters, ethers, comparatively narrow aromatic cuts such as xylene and isomer mixtures thereof are less problematic. This is surprising in that xylenes, analogously to the aromatic mixtures, likewise bear benzylic hydrogen atoms that could be involved in color development. An additional factor is that Solvent Naphtha mixtures, depending on the source and storage times, can have distinctly different effects on color number drift when used in the polyisocyanate compositions.

In addition, further antioxidants (F) may be present.

The further antioxidants are preferably selected from the group consisting of phosphites, phosphonites, phosphonates and thioethers. Further primary antioxidants are, for example, secondary arylamines.

Phosphites are compounds of the $P(OR^a)(OR^b)(OR^c)$ type with $R^a$, $R^b$, $R^c$ as identical or different aliphatic or aromatic radicals (which may also form cyclic or Spiro structures).

Preferred phosphonites are described in WO 2008/116894, particularly from page 11 line 8 to page 14 line 8 therein, which is hereby incorporated into the present disclosure by reference.

Preferred phosphonates are described in WO 2008/116895, particularly from page 10 line 38 to page 12 line 41 therein, which is hereby incorporated into the present disclosure by reference.

Particular preference is given to mono- and dialkylphosphonates and to dialkyl diphosphonates.

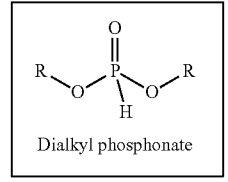

Dialkyl phosphonate

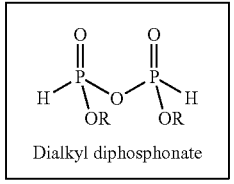

Dialkyl diphosphonate

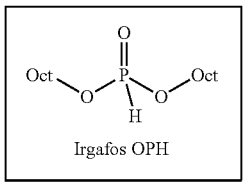

Irgafos OPH

Examples of these are mono- and di-$C_1$- to $C_{12}$-alkyl phosphonates and mixtures thereof, preferably the dialkyl phosphonates, more preferably those with $C_1$- to $C_8$-alkyl groups, most preferably those with $C_1$- to $C_8$-alkyl groups and especially those with $C_1$-, $C_2$-, $C_4$- or $C_8$-alkyl groups.

The alkyl groups in dialkyl phosphonates may be the same or different; they are preferably the same.

Examples of $C_1$- to $C_{12}$-alkyl groups are methyl, ethyl, isopropyl, n-propyl, n-butyl, isobutyl, sec-butyl, tert-butyl, n-hexyl, n-heptyl, n-octyl, n-decyl, n-dodecyl, 2-ethylhexyl and 2-propylheptyl, preferably di-n-octyl phosphate Irgafos® OPH (see figure above), di-n-butyl phosphate and di(2-ethylhexyl) phosphate, especially di-n-octyl phosphate.

Phosphonic acids are generally used in amounts based on the polyisocyanate of 10 to 1000, preferably 20 to 600 and more preferably 50 to 300 ppm by weight.

Preferred thioethers are described in WO 2008/116893, particularly from page 11 line 1 to page 15 line 37 therein, which is hereby incorporated into the present disclosure by reference.

Examples of further coatings additives (G) that may be used include: UV stabilizers such as UV absorbers and suitable free radical scavengers (especially HALS compounds, hindered amine light stabilizers), desiccants, antistatic agents, flame retardants, thickeners, thixotropic agents, surface-active agents, viscosity modifiers, plasticizers or chelating agents. Preference is given to UV stabilizers.

Suitable UV absorbers include oxanilides, triazines and benzotriazoles (the latter available, for example, as Tinuvin® grades from BASF SE) and benzophenones (e.g. Chimassorb® 81 from BASF SE). Preference is given, for example, to 95% benzenepropanoic acid, 3-(2H-benzotriazol-2-yl)-5-(1,1-dimethylethyl)-4-hydroxy-, C7-9-branched and linear alkyl esters; 5% 1-methoxy-2-propyl acetate (e.g. Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g. Tinuvin® 1130), in each case products, for example, of BASF SE. DL-alpha-Tocopherol, tocopherol, cinnamic acid derivatives and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from BASF SE. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g. Tinuvin® 144 from BASF SE); a mixture of bis(1,2,2,6,6-pentamethyl-4-piperidinyl)sebacate and methyl(1,2,2,6,6-pentamethyl-4-piperidinyl) sebacate (e.g. Tinuvin® 292 from BASF SE); or which are N—(O-alkylated), such as, for example, decanedioic acid bis(2,2,6,6-tetramethyl-1-(octyloxy)-4-piperidinyl) ester, reaction products with 1,1-dimethylethyl hydroperoxide and octane (e.g., Tinuvin® 123 from BASF SE), and especially the HALS triazine "2-aminoethanol, reaction products with cyclohexane and peroxidized N-butyl-2,2,6,6-tetramethyl-4-piperidinamine-2,4,6-trichloro-1,3,5-triazine reaction product" (e.g. Tinuvin® 152 from BASF SE).

Desiccants are, for example, para-toluenesulfonyl isocyanate (e.g. Additive TI from Borchers/OMG) and ethyl orthoformate (e.g. Additive OF from Borchers/OMG).

UV stabilizers are used usually in amounts of 0.1% to 5.0% by weight, based on the solid components comprised in the preparation.

Suitable thickeners include not only free-radically (co)polymerized (co)polymers but also customary organic and inorganic thickeners such as hydroxymethylcellulose or bentonite.

Chelating agents which can be used include, for example, ethylenediamineacetic acid and salts thereof and also β-diketones.

As component (H) in addition it is possible for fillers, dyes and/or pigments to be present.

Pigments in the true sense are, according to CD Rompp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixed coat system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blancfixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers include silicates, for example silicates obtainable by hydrolysis of silicon tetrachloride, such as Aerosil® from Degussa, siliceous earth, talc, aluminum silicates, magnesium silicates, and calcium carbonates, etc.

For stabilization of the polyisocyanate compositions, at least one silyl ester (B) in an amount of 0.2 to 300 ppm by weight based on component (A), at least one sterically hindered phenol (C), at least one Lewis-acidic organic metal compound (D), at least one solvent (E), optionally at least one further antioxidant (F), and optionally other coatings components (G) are additionally added to the at least one polyisocyanate (A).

In a preferred embodiment, in a first step, polyisocyanates (A), silyl esters (B), sterically hindered phenol (C) and optionally solvent (E) are converted to a polyisocyanate composition.

Preferred solvents in this first step are n-butyl acetate, ethyl acetate, 1-methoxyprop-2-yl acetate, 2-methoxyethyl acetate, xylene, Solvesso® 100, and mixtures thereof.

The polyisocyanate composition obtained in the first step is then converted to a polyisocyanate composition of the invention in a second step by adding further components, especially Lewis acid (D) and solvent (E). It is optionally possible to add further components (A) to (G) thereto.

The polyisocyanate compositions of the invention are, for example, of the following composition:
(A) 20% to 99%, preferably 30% to 95% of polyisocyanate, more preferably 35% to 90% by weight, very preferably 40% to 80% by weight,
(B) 0.2 to 300 ppm by weight of silyl ester, preferably 30 to 200 ppm,
(C) 20 to 2000 ppm by weight sterically hindered phenol, preferably 50 to 1000, more preferably 100-600, most preferably 100-300,
(D) 5 to 10 000 ppm by weight of a Lewis acid, preferably 20-2000 and more preferably 50 to 500 ppm by weight, especially 20 to 300 ppm by weight,
(E) 1% to 80% by weight of solvent, preferably 5% to 70% by weight of solvent, more preferably 10-65% by weight, most preferably 20% to 60% by weight,
(F) 0 to 1000 ppm of each further antioxidant, preferably 50-700 ppm, more preferably 100-300 ppm,
(G) 0-5% by weight of further additives,
(H) optionally, in addition to the above components (A) to (G), fillers, dyes and/or pigments,
with the proviso that the weight figures for components (B), (C), (D), (F), and (G) are based on polyisocyanate (A) and the sum total of components (A) and (E) is always 100% by weight.

In a preferred variant, the weight ratio of the at least one isocyanate (A) to the at least one solvent (E) is 9:1 to 2:8, more preferably 9:1 to 6:4.

The polyisocyanate compositions of the invention can advantageously be used as curing components in addition to at least one binder in polyurethane coatings.

For production of a polyurethane coating, the polyisocyanate compositions are reacted with at least one binder comprising isocyanate-reactive groups.

The reaction with binders can optionally be effected after a long period of time as required by corresponding storage of the polyisocyanate composition. The polyisocyanate composition is preferably stored at room temperature, but can also be stored at higher temperatures. In practice, heating of such polyisocyanate composition to 30° C., 40° C., or even to 60° C., is possible during storage.

The binders may, for example, be polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft polymers of the substance groups mentioned with, for example, different glass transition temperatures, and mixtures of the binders mentioned. Preference is given to polyacrylate polyols, polyester polyols and polyurethane polyols, particular preference to polyacrylate polyols and polyester polyols.

Preferred OH numbers, measured to DIN 53240-2 (potentiometric), are 40-350 mg KOH/g of solid resin for polyesters, preferably 80-180 mg KOH/g of solid resin, and 15-250 mg KOH/g of solid resin for polyacrylate polyols, preferably 80-160 mg KOH/g.

In addition, the binders may have an acid number to DIN EN ISO 3682 (potentiometric) up to 200 mg KOH/g, preferably up to 150 and more preferably up to 100 mg KOH/g.

Polyacrylate polyols preferably have a molecular weight $M_n$ of at least 500 and more preferably at least 1200 g/mol. The molecular weight $M_n$ may in principle be unlimited at the upper end, preferably up to 50 000, more preferably up to 20 000 and even more preferably up to 10 000 g/mol, and especially up to 5000 g/mol.

The hydroxy-functional monomers (see below) are included in the copolymerization in such amounts as to result in the abovementioned hydroxyl numbers of the polymers.

These are hydroxyl-containing copolymers of at least one hydroxyl-containing (meth)acrylate with at least one further polymerizable comonomer selected from the group consisting of alkyl (meth)acrylates, vinyl aromatics, α, β-unsaturated carboxylic acids and other monomers.

Examples of alkyl (meth)acrylates include $C_1$-$C_{20}$-alkyl (meth)acrylates, vinylaromatics are those having up to 20 carbon atoms, α,β-unsaturated carboxylic acids also include the anhydrides thereof, and other monomers are, for example, vinyl esters of carboxylic acids comprising up to 20 carbon atoms, ethylenically unsaturated nitriles, vinyl ethers of alcohols comprising 1 to 10 carbon atoms and, less preferably, aliphatic hydrocarbons having 2 to 8 carbon atoms and 1 or 2 double bonds.

Preferred alkyl (meth)acrylates are those having a $C_1$-$C_{10}$-alkyl radical, such as methyl methacrylate, methyl acrylate, n-butyl acrylate, ethyl acrylate, and 2-ethylhexyl acrylate.

In particular, mixtures of the alkyl (meth)acrylates are also suitable.

Vinyl esters of carboxylic acids having 1 to 20 carbon atoms are, for example, vinyl laurate, vinyl stearate, vinyl propionate, and vinyl acetate.

Examples of possible α,β-unsaturated carboxylic acids and their anhydrides include: acrylic acid, methacrylic acid, fumaric acid, crotonic acid, itaconic acid, maleic acid or maleic anhydride, preferably acrylic acid.

Hydroxy-functional monomers include monoesters of α,β-unsaturated carboxylic acids such as acrylic acid, methacrylic acid (referred to for short in this specification as "(meth)acrylic acid") with diols or polyols that have preferably 2 to 20 carbon atoms and at least two hydroxyl groups, such as ethylene glycol, diethylene glycol, triethylene glycol, 1,2-propylene glycol, 1,3-propylene glycol, 1,1-dimethylethane-1,2-diol, dipropylene glycol, triethylene glycol, tetraethylene glycol, pentaethylene glycol, tripropylene glycol, butane-1,4-diol, pentane-1,5-diol, neopentyl glycol, neopentyl glycol hydroxypivalate, 2-ethylpropane-1,3-diol, 2-methylpropane-1,3-diol, 2-butyl-2-ethylpropane-1,3-diol, hexane-1,6-diol, 2-methylpentane-1,5-diol, 2-ethylbutane-1,4-diol, 2-ethylhexane-1,3-diol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF having a molecular weight between 162 and 4500, preferably 250 to 2000, poly-1,3-propanediol or polypropylene glycol having a molecular weight between 134 and 2000 or polyethylene glycol having a molecular weight between 238 and 2000.

Preference is given to 2-hydroxyethyl acrylate, 2-hydroxyethyl methacrylate, 2- or 3-hydroxypropyl acrylate, butane-1,4-diol monoacrylate or 3-(acryloyloxy)-2-hydroxypropyl acrylate, and particular preference to 2-hydroxyethyl acrylate and/or 2-hydroxyethyl methacrylate.

Examples of useful vinylaromatic compounds include vinyltoluene, α-butylstyrene, α-methylstyrene, 4-n-butylstyrene, 4-n-decylstyrene and, preferably, styrene.

Examples of nitriles include acrylonitrile and methacrylonitrile.

Examples of suitable vinyl ethers include vinyl methyl ether, vinyl isobutyl ether, vinyl hexyl ether, and vinyl octyl ether.

Nonaromatic hydrocarbons having 2 to 8 carbon atoms and one or two olefinic double bonds include butadiene, isoprene, and also ethylene, propylene, and isobutylene.

Additionally it is possible to use N-vinylformamide, N-vinylpyrrolidone, and N-vinylcaprolactam, and also ethylenically unsaturated acids, especially carboxylic acids, acid anhydrides or acid amides, and also vinylimidazole. Comonomers containing epoxide groups as well, such as glycidyl acrylate or methacrylate, for example, or monomers such as N-methoxymethylacrylamide or -methacrylamide, can be used additionally in small amounts.

Preference is given to esters of acrylic acid and/or of methacrylic acid having 1 to 18, preferably 1 to 8, carbon atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The monomers bearing hydroxyl groups are used, in the copolymerization of the (meth)acrylates bearing hydroxyl groups, in a mixture with other polymerizable monomers, preferably radically polymerizable monomers, preferably those which are composed to an extent of more than 50% by weight of $C_1$-$C_{20}$, preferably $C_1$-$C_4$, alkyl (meth)acrylate, (meth)acrylic acid, vinylaromatics having up to 20 carbon atoms, vinyl esters of carboxylic acids comprising up to 20 carbon atoms, vinyl halides, nonaromatic hydrocarbons having 4 to 8 carbon atoms and 1 or 2 double bonds, unsaturated nitriles, and mixtures thereof. Particularly preferred polymers are those which besides the monomers bearing hydroxyl groups are composed to an extent of more than 60% by weight of $C_1$-$C_{10}$-alkyl (meth)acrylates, styrene and its derivatives, or mixtures thereof.

The polymers can be prepared by polymerization, by conventional methods. Preferably the polymers are prepared in an emulsion polymerization or in organic solution. Continuous or discontinuous polymerization processes are possible. The discontinuous processes include the batch process and the feed process, the latter being preferred.

In the feed process, the solvent is introduced as an initial charge, on its own or with a portion of the monomer mixture, this initial charge is heated to the polymerization temperature, the polymerization is initiated radically in the case of an initial monomer charge, and the remaining monomer mixture is metered in, together with an initiator mixture, in the course of 1 to 10 hours, preferably 3 to 6 hours. Subsequently, the batch is optionally reactivated, in order to carry out the polymerization to a conversion of at least 99%.

Further binders are, for example, polyester polyols as obtainable by condensation of polycarboxylic acids, especially dicarboxylic acids, with polyols, especially diols. In order to assure appropriate functionality of the polyester polyol for the polymerization, there is also some degree of use of triols, tetraols etc., and of triacids etc.

Polyester polyols are known, for example, from Ullmanns Enzyklopädie der technischen Chemie [Ullmann's Encyclopedia of Industrial Chemistry], 4th edition, vol. 19, p. 62 to 65. Preference is given to using polyester polyols obtained by reaction of dihydric alcohols with dibasic carboxylic acids. Instead of using free polycarboxylic acids, the polyester polyols may also be produced using the corresponding polycarboxylic anhydrides or the corresponding polycarboxylic esters of lower alcohols or mixtures thereof. The polycarboxylic acids may be aliphatic, cycloaliphatic, aromatic or heterocyclic and may be optionally substituted, for example by halogen atoms, and/or unsaturated. Examples thereof include:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH where y is a number from 1 to 20, preferably an even number from 2 to 20; more preferably hexahydrophthalic anhydride, succinic acid, adipic acid, sebacic acid, and dodecanedicarboxylic acid.

Useful polyhydric alcohols for preparation of the polyesterols include propane-1,2-diol, ethylene glycol, 2,2-dimethylethane-1,2-diol, propane-1,3-diol, butane-1,2-diol, butane-1,3-diol, butane-1,4-diol, 3-methylpentane-1,5-diol, 2-ethylhexane-1,3-diol, 2,4-diethyloctane-1,3-diol, hexane-1,6-diol, polyTHF having a molar mass between 162 and 4500, preferably 250 to 2000, polypropane-1,3-diol having a molar mass between 134 and 1178, polypropane-1,2-diol having a molar mass between 134 and 898, polyethylene glycol having a molar mass between 106 and 458, neopentyl glycol, neopentyl glycol hydroxypivalate, 2-ethylpropane-1,3-diol, 2-methylpropane-1,3-diol, 2,2-bis(4-hydroxycyclohexyl)propane, cyclohexane-1,1-, -1,2-, 1,3-, and -1,4-dimethanol, cyclohexane-1,2-, -1,3- or -1,4-diol, trimethylolbutane, trimethylolpropane, tri methylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if appropriate may have been alkoxylated as described above.

Preferred alcohols are those of general formula HO—$(CH_2)_x$—OH where x is a number from 1 to 20, preferably an even number from 2 to 20. Preference is given to trimethylolpropane, glycerol, neopentyl glycol, ethylene glycol, butane-1,4-diol, hexane-1,6-diol, octane-1,8-diol, and dodecane-1,12-diol.

In addition, polycarbonate diols are also useful, as can be obtained for example by reacting phosgene with an excess of the low-molecular-weight alcohols mentioned as structural components for the polyester polyols.

Other polyester diols which are suitable are based on lactones, taking the form of lactone homopolymers or mixed polymers, preferably of adducts of lactones onto suitable difunctional starter molecules, having terminal hydroxyl groups. Useful lactones are preferably those derived from compounds of general formula HO—$(CH_2)_z$—COOH where z is a number from 1 to 20 and one hydrogen atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight divalent alcohols which have been mentioned above as formation component for the polyester polyols. The corresponding polymers of ε-caprolactone are particularly preferred. Lower polyester diols or polyether diols may also be employed as starters for producing the lactone polymers. Instead of the polymers of lactones, the corresponding chemically equivalent polycondensates of the hydroxycarboxylic acids corresponding to the lactones may also be employed.

In polyurethane coatings, molar masses $M_n$ of the polyesters of 800-4000 g/mol are customary, although the polyesters used here are not limited thereto.

Further suitable binders are also polyetherols, which are prepared by addition of ethylene oxide, propylene oxide and/or butylene oxide, preferably ethylene oxide and/or propylene oxide and more preferably ethylene oxide, onto H-active components. Likewise suitable are polycondensates of butanediol. In polyurethane coatings, molar masses of the polyethers of 500-2000 g/mol are customary, although the polyethers used here are not limited thereto.

The polymers may be at least partly replaced by what are called reactive diluents. These may be blocked secondary or primary amines (aldimines and ketimines) or compounds having sterically hindered and/or electron-deficient secondary amino groups, for example aspartic esters according to EP 403921 or WO 2007/39133.

For curing of the film, polyisocyanate composition and binder are mixed with one another in a molar ratio of isocyanate groups to isocyanate-reactive groups of 0.2:1 to 5:1, preferably 0.8:1 to 1.2:1 and especially 0.9:1 to 1.1:1, and it is optionally possible to mix in further coatings constituents, and the mixture is applied to the substrate and cured at ambient temperature up to 150° C.

The coating mixture is preferably cured at a temperature between room temperature and 140° C.

In a particularly preferred variant, the coating mixture is cured at ambient temperature to 80° C., more preferably to 60° C., most preferably to 40° C. Curing can also be effected with infrared radiation. The articles are preferably those that cannot be cured at high temperatures, such as large machines, aircraft, large vehicles and refinish applications, optionally plastics.

In another application, the coating mixture is cured at 110-140° C. (for example for OEM applications).

"Hardening" in the context of the present invention is understood to mean the creation of a tack-free coating on a substrate by heating the coating material applied to the substrate to the above-specified temperature at least until at least the desired freedom from tack has occurred.

In the context of the present document, a coating material is understood to mean a mixture at least of the components intended for coating of at least one substrate for the purpose of forming a film and, after curing, a tack-free coating.

The substrates are coated by typical methods known to the skilled person, with at least one coating composition being applied in the desired thickness to the substrate to be coated, and the volatile constituents optionally present in the coating composition being removed, optionally with heating. This operation may if desired be repeated one or more times. Application to the substrate may take place in a known way, such as for example by spraying, troweling, knifecoating, brushing, rolling, roller coating, pouring, laminating, injection-backmolding or coextruding.

The thickness of a film of this kind for curing may be from 0.1 μm up to several mm, preferably from 1 to 2000 μm, more preferably 5 to 200 μm, very preferably from 5 to 60 μm, especially from 20 to 50 μm (based on the coating material in the state in which the solvent has been removed from the coating material).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated, preferably metals, precoated surfaces and plastics.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction (ACE), decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood flooring, can coating and coil coating, for floor coverings, such as in parking levels or in hospitals, in automotive finishes, as OEM and refinish, more preferably refinish and industrial applications.

More particularly, the coating compositions of the invention are used as clearcoat(s), basecoat(s) and topcoat(s), topcoats, primers and primer surfacers preferably as clearcoats.

Polyisocyanate compositions of this kind can be used as curing agent in coatings, adhesives and sealants; they are preferably used in coatings.

It is an advantage of the polyisocyanate compositions of the invention that they keep polyisocyanate mixtures color-stable over a long period in the presence of urethanization catalysts.

EXAMPLES

Feedstocks:
Polyisocyanates (A): isocyanurate based on hexamethylene diisocyanate
Polyisocyanate (A1), Polyisocyanurate:
Hexamethylene diisocyanate HDI was converted in the presence of 80 ppm of benzyltrimethylammonium hydroxyisobutyrate as catalyst based on hexamethylene diisocyanate, 60% in ethylene glycol, in a multistage reactor cascade at 115, 120 and 130° C. Hexamethylene diisocyanate was distilled off in a multistage process with HDI recycling. NCO content of the product: 22.2%, viscosity: 2675 mPa*s
Polyisocyanate (A2), Polyisocyanurate:
Hexamethylene diisocyanate HDI was converted in the presence of 87 ppm of benzyltrimethylammonium hydroxyisobutyrate as catalyst based on hexamethylene diisocyanate, 5% in 2-ethylhexanol, in a multistage reactor cascade at 120° C. Hexamethylene diisocyanate was distilled off in a multistage process with HDI recycling. NCO content of the product: 22.1%, viscosity: 2750 mPa*s.
Polyisocyanate (A3): Isocyanurate Based on Hexamethylene Diisocyanate
Basonat HI 100 (BASF SE): NCO content of the product: 22.0%, viscosity about 2900 mPa*s.
Polyisocyanate (A4): Isocyanurate Based on Hexamethylene Diisocyanate:
Hexamethylene diisocyanate HDI was converted in the presence of 66 ppm of benzyltrimethylammonium hydroxyisobutyrate as catalyst based on hexamethylene diisocyanate, 5% in 2-ethylhexanol, in a multistage reactor cascade at 100, 120 and 140° C. Termination was by thermal means at 140° C. Hexamethylene diisocyanate was distilled off in a multistage process with HDI recycling. NCO content of the product: 22.2%, viscosity: 2580 mPa*s.

| Silyl derivatives: | |
|---|---|
| Tris(trimethylsilyl) phosphate | from Sigma-Aldrich. - inventive |
| trimethylsilyl trifluoroacetate | from Sigma-Aldrich. - noninventive |
| N,O-Bis(trimethylsilyl)acetamide | from Sigma-Aldrich. - noninventive |
| 1,3-Bis(trimethylsilyl)urea | from Sigma-Aldrich. - noninventive |
| hexamethyldisilazane | from Sigma-Aldrich. - noninventive |
| Sterically hindered phenols (C): | |
| Irganox ® 1010: | pentaerythritol tetrakis(3-(3,5-di-tert-butyl-4-hydroxyphenyl)-propionate, from BASF SE |
| Irganox ® 1076: | octadecyl 3-(3,5-di-tert-butyl-4-hydroxyphenyl)propionate, from BASF SE |
| Irganox ® 1135: | isooctyl 3-(3,5-di-tert-butyl-4-hydroxyphenyl)propionate; from BASF SE |
| Lewis-acidic catalysts (D): | |
| DBTL | dibutyltin dilaurate (DBTL): from Sigma-Aldrich |
| Solvents (E): | |
| Solvent Naphtha (boiling range about 170-180° C.) | |
| Methyl amyl ketone | from Sigma-Aldrich |
| Secondary antioxidants (F): | |
| Triphenyl phosphite | from Alfa Aesar |
| Tributyl phosphite | from Sigma-Aldrich |
| Irgafos ® OPH | from BASF SE |

Storage Tests:
The polyisocyanates (A) were stored under nitrogen in 50% by weight solutions in solvent (E) (1:1 in % by weight) with the concentrations specified in the experiments of silyl ester (B), Lewis acid catalysts (D), optionally sterically hindered phenols (C), optionally further additives, in firmly closed screwtop vessels (25 g in 30 mL vessels) at 50° C. air circulation ovens for exclusion of air. Traces of air are not ruled out.

Storage test 1: 50% polyisocyanate (A), 50% Solvesso® 100, 1000 ppm by weight of dibutyltin dilaurate based on polyisocyanate Storage test 2: 50% polyisocyanate (A), 50% methyl amyl ketone, 1000 ppm by weight of dibutyltin dilaurate based on polyisocyanate The concentrations of the compounds (B), (C), (D), (F) in ppm by weight, in the respectively undiluted state of the compounds (B), (C), (D), (F), relate to the total amount of polyisocyanate (A).

Color numbers are measured directly (immediately prior to commencement of storage) and after storage of the different periods of time. The color number is measured in APHA to DIN EN 1557 on a Lico 150 from Lange in a 5 cm analytical cuvette having a volume of 5 mL. Error tolerances for the target value are 20 Hz (+/−5, actual value 18 Hz); target value 102 Hz (+/−10, actual value 99 Hz); target value 202 Hz (+/−20, actual value 197 Hz). Color numbers are measured directly (immediately prior to commencement of storage), after storage after 7; 28; 70 and optionally after 105 days. The lower the color numbers the better.

Storage test 1: 50% polyisocyanate, 50% Solvesso® 100, 1000 ppm
DBTL/polyisocyanate
Series 1 in storage test 1 for color number drift of a solution consisting of 50% polyisocyanate A, 50% Solvesso® 100, 1000 ppm DBTL/polyisocyanate:

| Series 1: polyisocyanate (A1): storage test 1 (Solvesso ® 100, DBTL) | | | | | |
|---|---|---|---|---|---|
| d/Hz | Additive (ppm) | 0 | 7 | 28 | 70 |
| V1 | 200 Irganox 1135 + 200 tributyl phosphite | 12 | 38 | 64 | 340 |
| B1 | 200 Irganox 1135 + 200 tributyl phosphite + 100 tris(trimethylsilyl) phosphate | 12 | 18 | 39 | 108 |
| V2 | 200 Irganox 1010 + 200 triphenyl phosphite | 11 | 57 | 84 | 340 |
| B2 | 200 Irganox 1010 + 200 triphenyl phosphite + 100 tris(trimethylsilyl) phosphate | 11 | 50 | 91 | 83 |
| V3 | 200 Irganox 1135 + 200 triphenyl phosphite | 14 | 70 | 81 | 174 |
| V4 | 200 Irganox 1135 + 200 triphenyl phosphite + 100 N,O-bis(trimethylsilyl)acetamide | 14 | 52 | 172 | 395 |
| V5 | 200 Irganox 1135 + 200 triphenyl phosphite + 100 1,3-bis(trimethylsilyl)urea | 14 | 76 | 94 | 240 |
| V6 | 200 Irganox 1135 + 200 triphenyl phosphite + 100 hexamethyldisilazane | 14 | 57 | 143 | 353 |
| B3 | 200 Irganox 1135 + 200 triphenyl phosphite + 100 tris(trimethylsilyl) phosphate | 14 | 58 | 83 | 85 |
| V7 | 200 Irganox 1010 + 200 Irgafos OPH | 11 | 83 | 63 | 359 |
| B4 | 200 Irganox 1010 + 200 ppm Irgafos OPH + 100 tris(trimethylsilyl) phosphate | 11 | 37 | 82 | 81 |
| V8 | 200 Irganox 1076 + 200 Irgafos OPH | 12 | 83 | 65 | 357 |
| B5 | 200 Irganox 1076 + 200 Irgafos OPH + 100 tris(trimethylsilyl) phosphate | 12 | 41 | 87 | 121 |
| V9 | 200 Irganox 1135 + 200 Irgafos OPH | 17 | 42 | 113 | 233 |

Series 1: polyisocyanate (A1): storage test 1 (Solvesso ® 100, DBTL)

| d/Hz | Additive (ppm) | 0 | 7 | 28 | 70 |
|---|---|---|---|---|---|
| V10 | 200 Irganox 1135 + 200 Irgafos OPH + 100 N,O-bis(trimethylsilyl)acetamide | 17 | 80 | 187 | 379 |
| V11 | 200 Irganox 1135 + 200 Irgafos OPH + 100 1,3-bis(trimethylsilyl)urea | 17 | 43 | 119 | 270 |
| V12 | 200 Irganox 1135 + 200 Irgafos OPH + 100 hexamethyldisilazane | 17 | 80 | 184 | 369 |
| B6 | 200 Irganox 1135 + 200 Irgafos OPH + 100 tris(trimethylsilyl) phosphate | 17 | 34 | 36 | 69 |

Result: Tris(trimethylsilyl) phosphate improves color drift stability in conjunction with phenolic antioxidants (C), optionally with a further antioxidant (F), including over the combination of phenol/phosphite (cf. WO 2005/089085) and phenol/phosphonate (Irgafos OPH; cf. WO 2008/116894).

Tris(trimethylsilyl) phosphate is the only effective trimethylsilyl-based additive in the examples. N,O-Bis(trimethylsilyl)acetamide; 1,3-bis(trimethylsilyl)urea; and hexamethyl-disilazane are worse [cf. EP 1833785 B1/US 8552137 B2].

Series 2: polyisocyanate (A2): storage test 1 (Solvesso ® 100, DBTL)

| d/Hz | Additive (ppm) | 0 | 7 | 28 | 70 |
|---|---|---|---|---|---|
| V13 | 200 Irganox 1135 + 200 Irgafos OPH | 10 | 39 | 63 | 141 |
| V14 | 200 Irganox 1135 + 200 Irgafos OPH + 50 trimethylsilyl trifluoroacetate | 9 | 42 | 64 | 139 |
| V15 | 200 Irganox 1135 + 200 Irgafos OPH + 100 trimethylsilyl trifluoroacetate | 8 | 44 | 71 | 174 |
| V16 | 200 Irganox 1135 + 200 Irgafos OPH + 50 tetrakis(trimethylsilyloxy)silane | 10 | 36 | 57 | 126 |
| V17 | 200 Irganox 1135 + 200 Irgafos OPH + 100 tetrakis(trimethylsilyloxy)silane | 10 | 31 | 53 | 154 |
| B7 | 200 Irganox 1135 + 200 Irgafos OPH + 50 tris(trimethylsilyl) phosphate | 10 | 12 | 15 | 14 |
| B8 | 200 Irganox 1135 + 200 Irgafos OPH + 100 tris(trimethylsilyl) phosphate | 10 | 10 | 15 | 14 |

Result: Tris(trimethylsilyl) phosphate is the only effective trimethylsilyl-based additive

Series 3: polyisocyanate (A4): storage test 1 (Solvesso ® 100, DBTL)

| d/Hz | Additive (ppm) | 0 | 7 | 28 | 70 |
|---|---|---|---|---|---|
| V18 | 200 Irganox 1135 + 200 Irgafos OPH | 17 | 22 | 43 | 116 |
| B9 | 200 Irganox 1135 + 200 Irgafos OPH + 100 tris(trimethylsilyl) phosphate | 17 | 21 | 25 | 28 |

Result: Color drift with tris(trimethylsilyl) phosphate is significantly lower.

Storage test 2: 50% polyisocyanate, 50% methyl amyl ketone, 1000 ppm DBTL/polyisocyanate The following storage tests were tested in the storage test 2 formulation with methyl amyl ketone and DBTL.

Series 4: polyisocyanate (A1): storage test 2

| d/Hz | Additive (ppm) | 0 | 7 | 28 | 70 | 105 |
|---|---|---|---|---|---|---|
| V19 | 100 tris(trimethylsilyl) phosphate | 22 | 43 | 72 | 106 | 143 |
| V20 | 200 triphenyl phosphite | 26 | 37 | 62 | 84 | 117 |
| V21 | 200 triphenyl phosphite + 100 tris(trimethylsilyl) phosphate | 21 | 38 | 65 | 105 | 138 |
| V22 | 200 Irgafos OPH | 27 | 40 | 68 | 97 | 160 |
| V23 | 200 Irgafos OPH + 100 tris(trimethylsilyl) phosphate | 25 | 38 | 65 | 107 | 141 |
| V24 | 200 Irganox 1135 | 27 | 35 | 55 | 88 | 116 |
| B10 | 200 Irganox 1135 + 100 tris(trimethylsilyl) phosphate | 22 | 34 | 39 | 49 | 54 |
| V25 | 200 Irganox 1135 + 200 tributyl phosphite | 17 | 27 | 66 | 141 | 209 |
| B11 | 200 Irganox 1135 + 200 tributyl phosphite + 100 tris(trimethylsilyl) phosphate | 18 | 18 | 24 | 36 | 43 |
| V26 | 200 Irganox 1010 + 200 triphenyl phosphite | 20 | 15 | 58 | 108 | 157 |
| B12 | 200 Irganox 1010 + 200 triphenyl phosphite + 100 tris(trimethylsilyl) phosphate | 20 | 24 | 24 | 40 | 54 |
| V27 | 200 Irganox 1076 + 200 triphenyl phosphite | 19 | 21 | 62 | 112 | 193 |
| B13 | 200 Irganox 1076 + 200 triphenyl phosphite + 100 tris(trimethylsilyl) phosphate | 19 | 20 | 32 | 39 | 48 |
| V28 | 200 Irganox 1135 + 200 triphenyl phosphite | 17 | 19 | 56 | 112 | 174 |
| B14 | 200 Irganox 1135 + 200 triphenyl phosphite + 50 tris(trimethylsilyl) phosphate | 17 | 24 | 27 | 42 | 49 |
| B15 | 200 Irganox 1135 + 200 triphenyl phosphite + 100 tris(trimethylsilyl) phosphate | 17 | 21 | 25 | 44 | 51 |
| V29 | 200 Irganox 1010 + 200 Irgafos OPH | 20 | 19 | 43 | 111 | 186 |
| B16 | 200 Irganox 1010 + 200 ppm Irgafos OPH + 100 tris(trimethylsilyl) phosphate | 20 | 22 | 30 | 39 | 48 |
| V30 | 200 Irganox 1076 + 200 Irgafos OPH | 20 | 22 | 51 | 95 | 155 |
| B17 | 200 Irganox 1076 + 200 Irgafos OPH + 100 tris(trimethylsilyl) phosphate | 20 | 20 | 29 | 41 | 48 |
| V31 | 200 Irganox 1135 + 200 Irgafos OPH | 17 | 28 | 48 | 129 | 198 |
| B18 | 200 Irganox 1135 + 200 Irgafos OPH + 1 ppm tris(trimethylsilyl) phosphate | 17 | 30 | 58 | 111 | 143 |
| B19 | 200 Irganox 1135 + 200 Irgafos OPH + 5 ppm tris(trimethylsilyl) phosphate | 17 | 16 | 43 | 90 | 117 |
| B20 | 200 Irganox 1135 + 200 Irgafos OPH + 10 ppm tris(trimethylsilyl) phosphate | 17 | 15 | 24 | 89 | 115 |
| B21 | 200 Irganox 1135 + 200 Irgafos OPH + 20 ppm tris(trimethylsilyl) phosphate | 17 | 17 | 19 | 76 | 110 |
| B22 | 200 Irganox 1135 + 200 Irgafos OPH + 50 ppm tris(trimethylsilyl) phosphate | 17 | 18 | 14 | 22 | 21 |
| B23 | 200 Irganox 1135 + 200 Irgafos OPH + 100 ppm tris(trimethylsilyl) phosphate | 17 | 16 | 22 | 22 | 17 |
| V32 | 200 Irganox 1135 + 200 Irgafos OPH + 300 ppm tris(trimethylsilyl) phosphate | 17 | 23 | 21 | 31 | 31 slighty cloudy |
| V33 | 200 Irganox 1135 + 200 Irgafos OPH + 1000 ppm tris(trimethylsilyl) phosphate | | | | | highly cloudy |

Result: Tris(trimethylsilyl) phosphate improves color drift stability in conjunction with phenolic antioxidants (C), optionally with a further antioxidant (F). Color number drift is not improved without phenolic antioxidant.
In the range from 1 to 100 ppm tris(trimethylsilyl) phosphate there are clear solutions with low color drift, at 300 ppm slight haze with low color drift, at 1000 ppm tris(trimethylsilyl) phosphate significant haze.

Series 5: polyisocyanate (A3): storage test 2 (methyl amyl ketone, DBTL)

| d/Hz | Additive (ppm) | 0 | 7 | 28 | 70 | 105 |
|---|---|---|---|---|---|---|
| V34 | none | 13 | 30 | 60 | 85 | 109 |
| V35 | 50 tris(trimethylsilyl) phosphate | 12 | 35 | 72 | 102 | 133 |
| V36 | 100 tris(trimethylsilyl) phosphate | 12 | 34 | 70 | 100 | 132 |
| V37 | 200 triphenyl phosphite | 12 | 34 | 62 | 83 | 120 |
| V38 | 200 triphenyl phosphite + 100 tris(trimethylsilyl) phosphate | 12 | 28 | 62 | 96 | 124 |
| V39 | 200 Irgafos OPH | 12 | 35 | 70 | 94 | 186 |
| V40 | 200 Irgafos OPH + 100 tris(trimethylsilyl) phosphate | 12 | 32 | 70 | 102 | 133 |
| V41 | 200 Irganox 1135 | 12 | 30 | 46 | 79 | 116 |
| B24 | 200 Irganox 1135 + 100 tris(trimethylsilyl) phosphate | 12 | 16 | 29 | 33 | 35 |
| V42 | 200 Irganox 1135 + 200 tributyl phosphite | 10 | 25 | 43 | 88 | 110 |
| B25 | 200 Irganox. 1135 + 200 tributyl phosphite + 100 tris(trimethylsilyl) phosphate | 10 | 18 | 22 | 31 | 34 |
| V43 | 200 Irganox 1010 + 200 triphenyl phosphite | 11 | 26 | 41 | 86 | 108 |
| B26 | 200 Irganox 1010 + 200 triphenyl phosphite + 100 tris(trimethylsilyl) phosphate | 11 | 18 | 23 | 33 | 46 |
| V44 | 200 Irganox 1135 + 200 triphenyl phosphite | 10 | 26 | 42 | 87 | 111 |
| B27 | 200 Irganox 1135 + 200 triphenyl phosphite + 50 tris(trimethylsilyl) phosphate | 10 | 16 | 20 | 33 | 25 |
| B28 | 200 Irganox 1135 + 200 triphenyl phosphite + 100 tris(trimethylsilyl) phosphate | 10 | 16 | 21 | 25 | 27 |
| B29 | 200 Irganox 1135 + 200 triphenyl phosphite + 300 tris(trimethylsilyl) phosphate | 10 | 18 | 22 | 31 | 28 |
| V45 | 200 Irganox 1135 + 200 triphenyl phosphite + 1000 tris(trimethylsilyl) phosphate | | | highly cloudy | | |
| V46 | 200 Irganox 1076 + 200 Irgafos OPH | 9 | 21 | 33 | 72 | 159 |
| B30 | 200 Irganox 1076 + 200 Irgafos OPH + 100 tris(trimethylsilyl) phosphate | 9 | 19 | 17 | 23 | 31 |
| V47 | 200 Irganox 1135 + 200 Irgafos OPH | 17 | 30 | 42 | 98 | 195 |
| B31 | 200 Irganox 1135 + 200 Irgafos OPH + 1 tris(trimethylsilyl) phosphate | 17 | 23 | 26 | 84 | 109 |
| B32 | 200 Irganox 1135 + 200 Irgafos OPH + 5 tris(trimethylsilyl) phosphate | 17 | 19 | 23 | 82 | 111 |
| B33 | 200 Irganox 1135 + 200 Irgafos OPH + 10 tris(trimethylsilyl) phosphate | 17 | 20 | 25 | 44 | 47 |
| B34 | 200 Irganox 1135 + 200 Irgafos OPH + 20 tris(trimethylsilyl) phosphate | 17 | 19 | 21 | 39 | 43 |
| B35 | 200 Irganox 1135 + 200 Irgafos OPH + 50 tris(trimethylsilyl) phosphate | 17 | 18 | 22 | 39 | 42 |
| B36 | 200 Irganox 1135 + 200 Irgafos OPH + 100 tris(trimethylsilyl) phosphate | 17 | 17 | 21 | 31 | 38 |
| B37 | 200 Irganox 1135 + 200 Irgafos OPH + 300 tris(trimethylsilyl) phosphate | 17 | 19 | 23 | 39 | 40 |
| V48 | 200 Irganox 1135 + 200 Irgafos OPH + 1000 tris(trimethylsilyl) phosphate | | | highly cloudy | | |

Result: Tris(trimethylsilyl) phosphate improves color drift stability in conjunction with phenolic antioxidants (C), optionally with a further antioxidant (F). Color number drift is not improved without phenolic antioxidant.
In the range from 1 to 300 ppm tris(trimethylsilyl) phosphate there are clear solutions with low color drift; at 1000 ppm tris(trimethylsilyl) phosphate there is significant cloudiness.

The invention claimed is:

1. A polyisocyanate composition comprising
   (A) at least one polyisocyanate obtained by reacting at least one monomeric (cyclo)aliphatic isocyanate selected from the group consisting of hexamethylene diisocyanate, pentamethylene diisocyanate, isophorone diisocyanate, 1,3-bis(isocyanatomethyl)cyclohexane, 4,4'-di(isocyanatocyclohexyl)methane and 2,4'-di(isocyanatocyclohexyl)methane, wherein the at least one polyisocyanate has an NCO content of at least 15% by weight,
   (B) at least one silyl ester selected from the group of silyl phosphates and silyl phosphonates in an amount of 0.2 to 300 ppm by weight, based on component (A),
   (C) at least one sterically hindered phenol having exactly one phenolic hydroxyl group per aromatic ring, and wherein at least one ortho position, relative to the phenolic hydroxyl group, bears a tert-butyl group,
   (D) at least one Lewis-acidic organic metal compound capable of accelerating the reaction of isocyanate groups with isocyanate-reactive groups,
   (E) at least one solvent,
   (F) optionally at least one further antioxidant, and
   (G) optionally other coatings additives;
   wherein the at least one silyl ester (B) is a tris(silyl) phosphate.

2. The polyisocyanate composition according to claim 1, wherein the at least one silyl ester (B) is present in an amount of 10 to 300 ppm by weight, based on component (A).

3. A polyisocyanate composition comprising
   (A) at least one polyisocyanate obtained by reacting at least one monomeric (cyclo)aliphatic isocyanate, wherein the at least one polyisocyanate has an NCO content of at least 15% by weight,
   (B) at least one silyl ester selected from the group of silyl phosphates and silyl phosphonates in an amount of 0.2 to 300 ppm by weight, based on component (A),
   (C) at least one sterically hindered phenol,
   (D) at least one Lewis-acidic organic metal compound capable of accelerating the reaction of isocyanate groups with isocyanate-reactive groups,
   (E) at least one solvent,
   (F) optionally at least one further antioxidant, and
   (G) optionally other coatings additives;
   wherein the at least one polyisocyanate (A) has been prepared using a catalyst based on ammonium carboxylate, ammonium α-hydroxyalkylcarboxylate or ammonium hydroxide.

4. The polyisocyanate composition according to claim 1, wherein the at least one Lewis-acidic organic metal compound (D) comprises a metal selected from the group consisting of tin, zinc, titanium, zirconium and bismuth.

5. The polyisocyanate composition according to claim 1, wherein the weight ratio of the at least one polyisocyanate (A) to the at least one solvent (E) is 9:1 to 2:8.

6. The polyisocyanate composition according to claim 1, wherein the at least one solvent (E) is selected from the group consisting of aromatic hydrocarbons, (cyclo)aliphatic hydrocarbons, ketones, esters, ethers, ether esters and carbonates.

7. The polyisocyanate composition according to claim 1, wherein the at least one further antioxidant (F) is present and is selected from the group of phosphites, phosphonates, phosphonites and thioethers.

8. A process for stabilizing polyisocyanate compositions according to claim 1, the process comprising:
adding at least one silyl ester (B) in an amount of 0.2 to 300 ppm by weight based on component (A), at least one sterically hindered phenol (C), at least one Lewis-acidic organic metal compound (D), at least one solvent (E), optionally at least one further antioxidant (F) and optionally other coatings components (G) to the at least one polyisocyanate (A).

9. A process for producing polyurethane coatings, comprising:
reacting a polyisocyanate composition according to claim 1 with at least one binder comprising isocyanate-reactive groups.

10. A process for producing polyurethane coatings, comprising:
reacting a polyisocyanate composition according to claim 1 with at least one binder selected from the group consisting of polyacrylate polyols, polyester polyols, polyether polyols, polyurethane polyols, polyurea polyols, polyetherols, polycarbonates, polyester polyacrylate polyols, polyester polyurethane polyols, polyurethane polyacrylate polyols, polyurethane-modified alkyd resins, fatty acid-modified polyester polyurethane polyols, copolymers with allyl ethers and copolymers or graft polymers thereof.

11. A process, comprising employing a polyisocyanate composition according to claim 1 as curing agent in coating materials in primers, primer surfacers, pigmented topcoats, basecoats and clearcoats in the sectors of automotive refinishing or large vehicle finishing, or in utility vehicles in the agricultural and construction sector.

12. The polyisocyanate composition according to claim 1, wherein the at least one (cyclo)aliphatic isocyanate is hexamethylene diisocyanate.

13. The polyisocyanate composition according to claim 1, wherein the at least one sterically hindered phenol (C) is selected from the group consisting of 2,6-bis-tert-butyl-4-methylphenol (BHT), 3-[3,5-di-tert-butyl-4-hydroxyphenyl] propionate, pentaerythritol tetrakis(3-(3,5-di-tert-butyl-4-hydroxyphenyl)-propionate, 3,3',3",5,5',5"-hexa-tert-butyl-a, a',a"-(mesitylene-2,4,6-triyl)tri-p-cresol, 1,3,5-tris(3,5-di-tert-butyl-4-hydroxybenzyl)-1,3,5-triazine-2,4,6(1H,3H, 5H)-trione, isooctyl 3-(3,5-di-tert-butyl-4-hydroxyphenyl) propionate and octadecyl 3-(3,5-di-tert-butyl-4-hydroxyphenyl)propionate.

14. The polyisocyanate composition according to claim 1, wherein the at least one sterically hindered phenol (C) is selected from the group consisting of 2,6-di-tert-butyl-4-methylphenol (BHT); isooctyl 3-(3,5-di-tert-butyl-4-hydroxyphenyl)propionate, octadecyl 3-(3,5-di-tert-butyl-4-hydroxyphenyl)propionate and pentaerythritol tetrakis(3-(3, 5-di-tert-butyl-4-hydroxyphenyl)propionate.

* * * * *